Oct. 27, 1936.    P. VAN WYK    2,059,066

FRUIT TREATING MACHINE

Filed March 21, 1934

INVENTOR.
Paul Van Wyk.
BY Philip A. Minnie
ATTORNEY.

Patented Oct. 27, 1936

2,059,066

UNITED STATES PATENT OFFICE 2,059,066

FRUIT TREATING MACHINE

Paul Van Wyk, Portland, Oreg., assignor to Food Machinery Corporation, San Jose, Calif., a corporation of Delaware Application March 21, 1934, Serial No. 716,605

7 Claims. (Cl. 34—1)

This invention relates to fruit treating machines and more especially to driers, although certain of its features may also be used to advantage in other types of fruit treating apparatus such as washers, polishers, cleaners and the like.

It is one of the principal objects of the invention to provide for the application of fabric wrappings to the treating rolls of fruit treating machines in such manner that they will firmly adhere to the rolls while at the same time leaving the outer exposed ends of the wrappings unfastened so that in operation they may be free to accommodate themselves to operating conditions.

It is also an object to provide a fruit drying machine with drying rolls having fabric coverings or wrappings which not only possess highly absorbent qualities but which are also of a suitable nature to impart a desirable polish to the fruit.

Another object is to provide a covering or wrapping of this character which will efficiently dry and polish fruit, but which is inexpensive and durable as well.

Various other objects and advantages in addition to those specifically mentioned will become more fully apparent as the description proceeds in connection with the accompanying drawing, wherein is illustrated a fruit drier embodying the various features of the invention.

Figure 1:
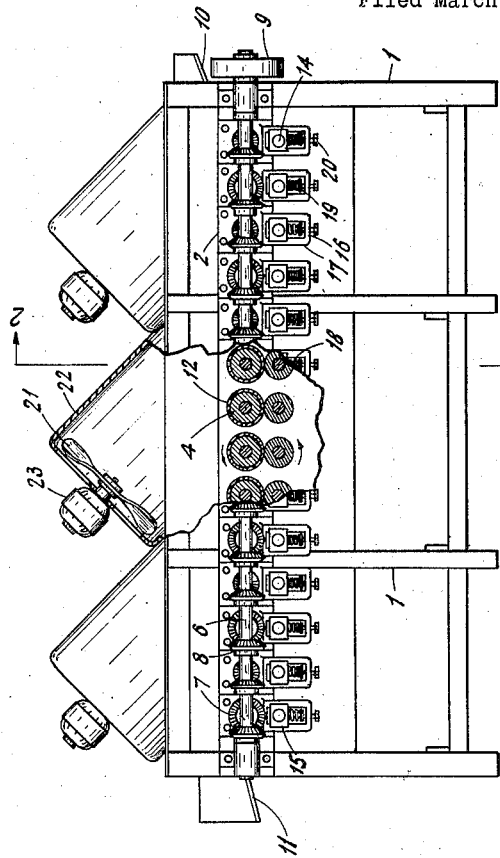
Figure 1 is a side elevation of the drier with certain portions broken away to better illustrate the interior of the machine.
Figure 2:
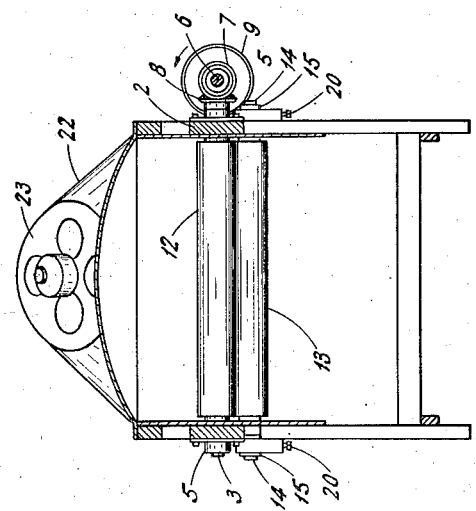
Figure 2 is an end elevation as viewed from the left of Figure 1.

The illustrated apparatus includes a suitable framework 1 including side rails 2 in which the drive shafts 3 of a series of transversely arranged fruit supporting and drying rolls 4 are rotatably journalled in bearings 5. The drying rolls 4 are all driven in a common direction, as indicated by the arrows, by means of a drive shaft 6 extending longitudinally of the machine along one side thereof and having secured thereto a series of bevel gears 7 arranged to intermesh with corresponding bevel gears 8 keyed to the outer ends of the roll shafts 3. Preferably alternate sets of the gears 7 and 8 are of different driving ratios than the others, as illustrated, whereby alternate rolls are driven at different speeds, thereby providing for the application of a differential buffing effect to fruit supported between the rolls. The shaft 6 may be driven by means of a pulley 9 supplied with power from any suitable source; and fruit may be fed to the machine over the delivery ramp 10 and discharged from the machine after traversing the rolls 4 over the discharge ramp 11.

For the purpose of removing moisture from the fruit as it passes over the rolls 4 each of the rolls is wrapped with an absorbent covering 12, and for this purpose I make use of an absorbent fabric having a piled surface, such as velours for example. Such fabric is wrapped about the rolls with its piled surface outermost. I have discovered that by using a fabric covering of this character a combined brushing and absorbing action is obtained, as the moisture is not only effectively absorbed from the fruit by the absorbent fabric, but the piling also imparts a desirable polish to the fruit thereby enhancing its appearance. Moreover, experience indicates that the piling also assists in the transfer of moisture from the fruit to the fabric and thus increases the effectiveness of the fabric and the rapidity of absorption.

To prevent retention of moisture by the absorbent roll coverings in such quantities as might impair their absorbent qualities, means is provided for continuously expressing moisture from the absorbent coverings. Such means may comprise a series of wringer rollers 13 mounted beneath the absorbent covered rolls 4 in such manner as to be yieldably maintained in operative engagement therewith. The wringer rollers 13 are mounted on shafts 14 journalled in bearings 15 which are slidably mounted for vertical movement in slots 16 provided in bearing guide members 17 secured to the side rails 2. To provide the necessary pressure for forcing the wringer rollers against the absorbent rolls, coil springs 18 are mounted below each bearing 15 and rest against stops 19 carried by adjusting screws 20 threaded into the lower portions of the guide members 17. By adjusting the screws 20 the pressure of the wringer rollers against the absorbent rolls may be varied as desired.

The removal of moisture from the fruit by the absorbent covered rolls may, if desired, be augmented by the use of an air blast mechanism such as, for example, the fans 21 arranged above the drying rolls in housings 22 and driven by means of electric motors 23.

Figure 4:
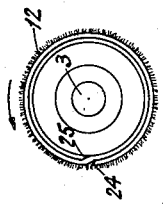
Figure 4 is an end view of Figure 3.
Figure 3:
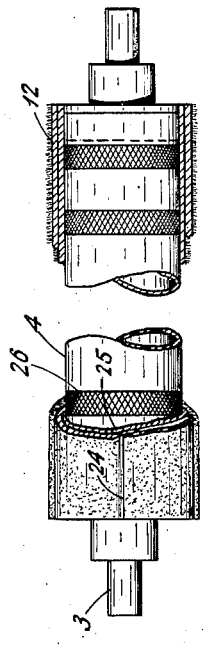
Figure 3 is a fragmentary side elevation of one of the drier rolls illustrating the manner in which the fabric covering is applied.

The absorbent fabric 12 is applied to the drying rolls 4 in accordance with my invention in the manner illustrated in Figures 3 and 4. As illustrated, the fabric may be applied to the rolls in substantially rectangular sheets and is wrapped several times around each roll so as to provide a plurality of superposed layers, the outer exposed end 24 of each wrapping being left free. It is important that the fabric be wrapped around the rolls in a direction counter to their direction of rotation. Thus, as shown in Figure 4, where the rotation of the roll is indicated as being counter-clockwise, the fabric is wrapped around the roll in clockwise direction. The fabric may be secured against slipping relative to the roll either by fastening its inner end 25 to the roll or, as illustrated, by providing the roll surface with roughened areas such as the encircling bands of knurling indicated at 26.

By applying the absorbent fabric to the rolls in the manner described, it will be observed that in operation the rotation of the rolls in directions counter to the directions of their wrappings tends to cause the wrappings to wrap tighter around the rolls, thus assisting them to stay in place, and slippage of the wrappings with respect to the rolls is prevented by the roughened areas 24 or, as suggested above, by suitably fastening the inner ends 25 of the wrappings to the rolls if desired. Also, in operation, the fabric is soon dampened by moisture absorbed from the fruit, and the weight of the fruit and pressure of the wringer rollers causes the outer free ends of the dampened fabric to stick to the layer thereafter and also presses the inner layer of the fabric into engagement with the roughened areas whereby to hold the fabric more firmly in place.

It will be appreciated that the absorption of moisture by the absorbent fabric coverings causes them to stretch, and it has been found that if the outer ends of the wrappings are fastened the resulting slack, due to stretching, tends to gather up into a bunch at the points of fastening so as to form protuberances on the rolls, which are not only likely to damage the fruit but also result in excessive wear on the fabric at these points, particularly if the gatherings of the fabric result in sufficient distortion from the cylindrical to cause the distorted portions of the rolls to come into contact with adjacent rolls.

It will be seen that by leaving the outer ends of the wrappings unfastened these difficulties are avoided, since the outer portions of the wrappings are free to shift relative to the underneath layers so as to take up any slack due to stretching and conform to the cylindrical shape of the rolls. It will also be observed that by wrapping the fabric several times around the rolls and leaving the outer ends free, it not only adheres to the rolls better, but the rolls need not run absolutely true, as the pressure of the wringer rollers causes the fabric to accommodate itself to any inequality of the rotation of the roll, with the result that after a short period of operation the fabric surface of the roll rotates practically true. This permits the use of relatively light and inexpensive materials for the rolls, such as the metal tubing illustrated, which could not be used if it were necessary that the tubing run absolutely true.

It is believed that the construction and advantages of the invention will now be clear, and it will be understood that while the invention has been described as specifically applied to a fruit drier, certain of its features, as for example the manner of applying the fabric wrappings to the treating rolls, may also be used to advantage in other types of fruit treating apparatus such as washers, polishers, cleaners and the like.

Having now described my invention and in what manner the same may be used, what I claim as new and desire to protect by Letters Patent is:

1. In a fruit treating machine, a plurality of fruit supporting rolls arranged in side by side relation, means for rotating said rolls, and fabric coverings wrapped about said rolls in a plurality of layers and in reverse direction with respect to the direction in which said rolls are rotated, said coverings having their outer exposed edges free from the layers of fabric therebeneath.

2. In a fruit treating machine, a plurality of fruit supporting rolls arranged in side by side relation, means for rotating said rolls, fabric coverings wrapped about said rolls in a plurality of layers and in reverse direction with respect to the direction in which said rolls are rotated, said coverings having their outer exposed edges free from the layers of fabric therebeneath, and means for securing the inner layer of fabric against slipping with respect to the rolls.

3. In a fruit treating machine, a plurality of fruit supporting rolls arranged in side by side relation, means for rotating said rolls, fabric coverings wrapped about said rolls in a plurality of layers and in reverse direction with respect to the direction in which said rolls are rotated, said coverings having their outer exposed edges free from the layers of fabric therebeneath, and said rolls having roughened areas on their surfaces for engagement with the inner layer of fabric to prevent the same from slipping with respect to the rolls.

4. In a fruit drying apparatus, a plurality of fruit supporting rolls arranged in side by side relation and covered with absorbent fabric having a piled surface outermost, means for rotating said rolls, said absorbent coverings being wrapped about said rolls in a plurality of layers and in reverse direction with respect to the direction in which said rolls are rotated and having their outer exposed ends free from the layers of fabric therebeneath, and means engaging with said rolls for removing moisture from said absorbent material.

5. In a fruit drying apparatus, a plurality of fruit supporting rolls rotatably mounted in side by side relation and covered with velours having its piled surface outermost, means for rotating said rolls, said velours coverings being wrapped about said rolls in a plurality of layers and in reverse direction with respect to the direction in which said rolls are rotated and having their outer exposed ends free from the layers therebeneath, and wringer rollers disposed beneath said rolls and in operative engagement therewith for expressing moisture therefrom.

6. In a fruit treating machine, means for supporting the fruit for treatment including a fruit supporting roll, means for rotating said roll, and a fabric covering wrapped about said roll in a plurality of layers and in reverse direction with respect to the direction in which said roll is rotated, said covering having its outer exposed end free from the layer of fabric therebeneath.

7. In a fruit treating machine, means for supporting the fruit for treatment including a fruit supporting roll, means for rotating said roll, an absorbent covering wrapped about said roll in a plurality of layers and in reverse direction with respect to the direction in which said roll is rotated, said covering having its outer exposed end free from the layer therebeneath, and means engaging said absorbent covered roll for expressing moisture from said absorbent covering.

PAUL VAN WYK.